US007014773B2

(12) United States Patent
Varadaraj

(10) Patent No.: US 7,014,773 B2
(45) Date of Patent: Mar. 21, 2006

(54) DEMULSIFICATION OF EMULSIONS BY SOCILLATORY MIXING

(75) Inventor: Ramesh Varadaraj, Flemington, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 94 days.

(21) Appl. No.: 10/721,959

(22) Filed: Nov. 25, 2003

(65) Prior Publication Data

US 2004/0167233 A1 Aug. 26, 2004

Related U.S. Application Data

(60) Provisional application No. 60/449,019, filed on Feb. 21, 2003.

(51) Int. Cl.
*B01D 17/05* (2006.01)

(52) U.S. Cl. ...................... 210/708; 204/567; 208/188; 210/709; 210/738; 210/748; 516/183

(58) Field of Classification Search ................ 204/567; 210/708, 709, 738, 748, 787; 208/188; 516/183
See application file for complete search history.

(56) References Cited

U.S. PATENT DOCUMENTS

| | | | | |
|---|---|---|---|---|
| 1,781,076 | A | 11/1930 | Palmer | |
| 2,257,997 | A * | 10/1941 | Bowling | 516/143 |
| 3,699,051 | A * | 10/1972 | Sampson | 516/165 |
| 3,980,280 | A * | 9/1976 | Benson | 366/150.1 |
| 4,283,290 | A * | 8/1981 | Davies | 210/643 |
| 4,737,265 | A * | 4/1988 | Merchant et al. | 208/188 |
| 5,538,628 | A | 7/1996 | Logan | 210/198.1 |
| 5,885,424 | A * | 3/1999 | Davis et al. | 204/157.42 |
| 6,228,239 | B1 | 5/2001 | Manalastas et al. | 204/567 |
| 6,555,009 | B1 * | 4/2003 | Varadaraj | 210/708 |
| 6,716,358 | B1 * | 4/2004 | Varadaraj | 210/708 |

FOREIGN PATENT DOCUMENTS

| | | |
|---|---|---|
| WO | WO 9534522 | 12/1996 |

* cited by examiner

*Primary Examiner*—Peter A. Hruskoci
(74) *Attorney, Agent, or Firm*—Ramesh Varadaraj; Gary P. Katz

(57) ABSTRACT

The invention includes a method for demulsification of water-in-oil emulsions, oil-in-water emulsions, and mixtures of water-in-oil and oil-in-water emulsions by oscillatory mixing of the emulsions.

20 Claims, 2 Drawing Sheets

DEMULSIFICATION OF EMULSIONS BY SOCILLATORY MIXING

This application claims the benefit of U.S. Provisional application No. 60/449,019 filed Feb. 21, 2003.

FIELD OF THE INVENTION

The invention includes a method for demulsification of emulsions comprising water and oil by oscillatory mixing the emulsion and recovering oil therefrom. The oil of the emulsion can be of any type including crude oils, crude oil distillates, crude oil residuum, vegetable oils, animal oils, synthetic oils and mixtures thereof.

BACKGROUND OF THE INVENTION

High naphthenic acid and asphaltene content crude oils possess the tendency to form stable emulsions of the water-in-crude oil and crude oil-in-water type. The polar naphthenic acids and asphaltenes in the crude oil stabilize dispersed water droplets in water-in-oil emulsions and the oil droplets in oil-in-water emulsions. Further, sub-micron size solids like silica and clay, when present in the crude oil, interact with the polar acids and asphaltenes and enhance the stability of the emulsions formed. Formation of stable water-in-crude oil and crude oil-in-water emulsions result in difficulty in separation of water and crude oil. The problem is faced both at production facilities and in refinery desalters.

Electrostatic demulsification in the presence of chemical demulsifiers is the most widely used technology for demulsification of water-in-crude oil emulsions. Gravity settling and centrifugation in conjunction with chemical demulsifiers are employed for water-in-oil and oil-in-water emulsions. Recently, a microwave technology (See for example U.S. Pat. Nos. 6,086,830 and 6,077,400) patented by Imperial Petroleum Recovery Corporation has emerged for treatment of hard to treat emulsions especially the rag layer. Thermal flash methods are also known in the art.

SUMMARY OF THE INVENTION

The instant invention includes a method for demulsifying an emulsion comprising water and oil comprising the steps of:

(a) oscillatory mixing said emulsion to form an oscillatory mixed emulsion;

(b) separating said oscillatory mixed emulsion into an oil phase and an a water phase; and (c) recovering said oil and water phases.

In a preferred embodiment the emulsion is oscillatory mixed at about a frequency corresponding to one of the fracture frequency of said emulsion.

The invention may further optionally comprise adding chemical demulsifiers to said emulsion prior to or during said oscillatory mixing step (a).

The invention also includes a method for separation of a water-in-oil emulsion in a process scheme including an on-line oscillatory mixer comprising the steps of:

(a) collecting a water-in-oil emulsion from said process scheme;

(b) determining the elastic modulus as a function of frequency for the said emulsion in the frequency range of 0.1 to 75 radians per second;

(c) determining the fracture frequencies of said emulsion from the said determination of the elastic modulus as a function of frequency;

(d) setting the said on-line oscillatory mixer to oscillate at a frequency corresponding to any one of said determined fracture frequencies;

(e) oscillatory mixing said water-in-oil emulsion in said on-line oscillatory mixer set to said determined fracture frequency; and (f) separating said mixed emulsion into a layer comprising water and a layer comprising oil.

DETAILED DESCRIPTION OF THE PREFERRED EMBODIMENTS

Figure 1:
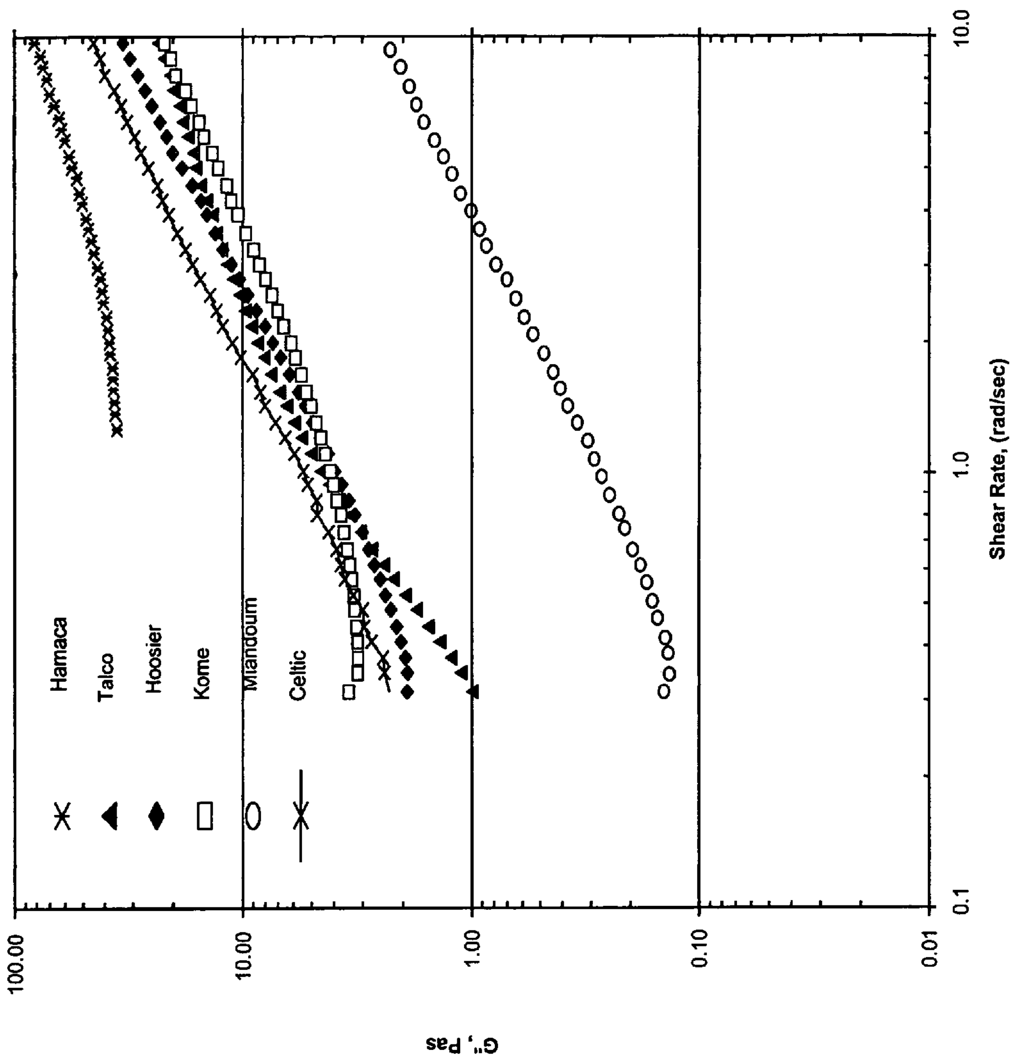
FIG. 1 is an illustrative example of viscous modulus (G") as a function of frequency for a set of water-in-oil emulsions made from crude oils indicated in the legends of FIG. 1.

The invention includes a method for recovering oil from an emulsion comprising oil and water. The emulsion can be a water-in-oil emulsion, an oil-in-water emulsion or mixtures of water-in-oil emulsion and oil-in-water emulsion. Water-in-oil emulsions, particularly those containing organic acids, asphaltenes, organic sulfur, basic nitrogen-containing compounds and solid particles, form highly viscoelastic fluids. Typically the water content of water-in-oil emulsions can vary in the range of 1 to 60 wt % based on the weight of the emulsion. Typically the oil content of oil-in-water emulsions can vary in the range of 1 to 80 wt % based on the weight of the emulsion. The oil-in-water emulsions are generally weakly viscoelastic, but the viscoelasticity increases to high values when the oil content of the oil-in-water emulsions are above 40 wt % by weight of the emulsion. A unique property of these viscoelastic emulsions is the existence of fracture frequencies at about which frequencies the emulsion microstructure fractures. The instant invention affords a method to demulsify emulsions comprising oil and water by fracturing the emulsions thereby forming a plurality of layers from which oil can be recovered.

Oscillatory viscometry measurements can determine the fracture frequencies for an emulsion. An oscillatory viscometer can impart an oscillatory strain on the emulsion and the stress corresponding to the strain is recorded. In an alternate mode, the oscillatory viscometer can impart an oscillatory stress on the emulsion and the strain corresponding to the stress is recorded. In a typical procedure, the emulsion is placed in a container cup, a cone is introduced into the cup and the cup is oscillated such that a sinusoidal oscillation occurs about the equilibrium point. The amplitude of oscillation can be fixed and the frequency of oscillation can be varied. By subjecting the emulsion to oscillatory strain at a fixed amplitude the viscous modulus (G") and elastic modulus (G') as a function of frequency can be determined. Fracture frequencies are the frequencies corresponding to the minima in the elastic modulus (G') versus frequency plot for a given emulsion. Illustrative examples are given in FIGS. 1 & 2. Two fracture frequencies are observed at frequencies of about 0.5 and about 8 radians per second corresponding to the two minima in the frequency versus elastic modulus plot. An emulsion can exhibit a multiplicity of fracture frequencies.

Oscillatory mixing of a fluid is subjecting the fluid to oscillatory stress or strain. An oscillatory mixer is an apparatus or device that can mix a fluid in oscillatory mode. One non-limiting method to subject a fluid to oscillatory strain is using the cup and cone apparatus described above. In the process of subjecting a fluid to oscillatory stress the cup or container of fluid is stationary and the cone is oscillated as described in the illustrative example given above. Another method of oscillatory mixing comprises introducing a fluid and a metal object in a container, attaching the container to a vertical support and subjecting the fluid and metal object to "up and down" type oscillatory motion. The "up and down" motion is also called "wrist action" type oscillatory motion. Preferably the metal object is a solid or hollow metal sphere. Yet another method of oscillatory mixing comprises placing a fluid and a metal object in a container, placing the container horizontal to the ground and oscillating the container about an equilibrium point. Yet another method of oscillatory mixing comprises pumping the fluid back and forth inside a container. The container is preferably a pipe. The pipe can have fins attached to the inner hollow chamber. The pipe with attached fins is also known as a static mixer. These are non-limiting illustrative examples of oscillatory mixing, any method or apparatus that can impart an oscillatory stress or stain can be used.

Oscillatory mixing can be conducted at any oscillatory frequency in the range of 0.1 to 75 radians per second. Preferably oscillatory mixing is conducted at about one of the multiplicity of fracture frequencies of the emulsion. When oscillatory mixing is conducted at about any one of the fracture frequencies it fractures the emulsion. It is preferred to conduct the oscillatory mixing at the second fracture frequency. The oscillatory mixing may be conducted at temperatures of the water-in-oil or oil-in-water emulsion of about 10 to about 100° C. and at pressures from ambient to 2000 psig (14800.4 kPa). The time of oscillatory mixing can vary in the range of 0.1 minutes to 48 hours. Typically it is mixed for a time required to fracture the emulsion and phase separate the oil from the water. Further, oscillatory mixing can be conducted in continuous or pulse mode. It is preferred to conduct the oscillatory mixing in the pulse mode. In the pulse mode of oscillatory mixing, the oscillatory mixing is conducted in pulses i.e., oscillatory mixed for a first period of time, stopped for a second period of time and then mixed again for a third period of time. The duration of the first, second and third time periods can be determined by optimization methods.

The invention may further comprise adding a chemical demulsifier to the emulsion prior to or during oscillatory mixing. Use of a chemical demulsifier is believed to weaken the elastic modulus of the viscoelastic fluid facilitating facile fracture. Chemical demulsifiers can lower the oscillatory mixing energy required to demulsify the emulsion. The preferred chemical demulsifiers will have a molecular weight of about 500 to about 5000, preferably about 500 to about 2000 and a hydrophilic lipophilic balance of above 9 and preferably from 9 to about 35 and most preferably from about 9 to about 15. Chemical demulsifiers will include, but are not limited to those that contain functional groups such as ethers, amines, ethoxylated alcohols, sulfonates and mixtures thereof.

A particularly preferred chemical demulsifier is a phenol-formaldehyde ethoxylated alcohol having the chemical structure

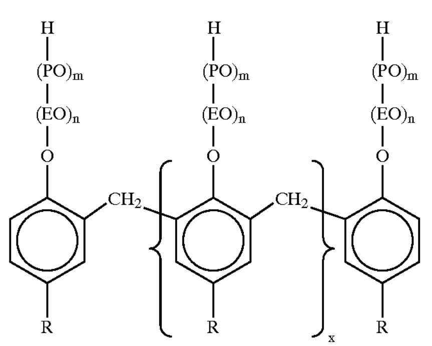

wherein R is selected from the group consisting of alkanes or alkenes from 8 to 20 carbons, E is $CH_2$—$CH_2$ and P is —$CH_2$—CH—$CH_3$, n ranges from 1 to 5, m ranges from 0 to 5 and x ranges from 3 to 9. These classes of demulsifiers are preferred for the water-in-oil emulsions.

The chemical demulsifier can be added to the emulsion prior to or during oscillatory mixing. The amount of chemical demulsifier to be added can range from about 0.005 to about 3.0 wt % based on the amount of the emulsion. Additionally, a delivery solvent may be employed. Such solvents may include crude oil distillates boiling in the range of about 70° C. to about 450° C., alcohols, ethers and mixtures thereof. The delivery solvent and chemical demulsifier form the demulsifier formulation. The delivery solvent can be present in an amount of from about 35 to about 75 wt % of the demulsifier formulation. The demulsifier formulation can be added to the emulsion in the range of 0.01 to 5 wt % based on the weight of the emulsion.

Oscillatory mixing at fracture frequency fractures the emulsion and coalesces the dispersed water droplets. Oscillatory mixing alone may be sufficient to separate the emulsion into water and oil phases or it may be combined with another separation methods such as centrifugation, gravity settling, hydrocyclones, application of an electrostatic field, microwave treatment or combinations thereof. For example, centrifugation can be conducted at 500 to 150,000 g for about 0.1 to about 6 hours or more, and electrostatic field application of about 500–5000 volts/inch for about 0.1 to about 24 hours or more.

The invention is applicable to any emulsion comprising water and oil, preferably the water-in-oil emulsion type, and especially those containing components such as organic acids and solids, and which may additionally include asphaltenes, basic nitrogen compounds and emulsifiers which are added or naturally present in the emulsion. Thus, the oils forming the emulsion may include crude oils, crude oil distillates, crude oil resids (residues from crude oil distillation e.g., atmospheric or vacuum distillation resids of crude oils), or oils derived from plant or animal sources such as vegetable oils and animal oils or synthetic oils such as silicone oils. The emulsion may likewise include surfactants or other emulsifiers present in the oil or added for forming the emulsion.

The solids present in the emulsion can be those naturally occurring in such oils such as clay and silica. These are called formation solids or reservoir solids. The solids can likewise have been intentionally added to form the emulsion. When solids are present, they contribute to stabilizing the emulsion and such emulsions are referred to as solids-stabilized emulsions. Typically, the solids, if present in the emulsion, can have an average total surface area of ≦1500 square microns, more preferably about 25 to about 1500 square microns, even more preferably about 50 to 1500 and most preferably about 100 to about 1500 square microns.

The water or aqueous phase of the emulsion comprises water and can include dissolved inorganic salts of chloride, sulfates and carbonates of Group I and II elements of the long form of The Periodic Table of Elements. Organic salts can also be present in the aqueous phase. Water comprising dissolved and suspended salts is generally called brine.

EXAMPLES

The following examples are meant to be illustrative and not limiting in any way. The example is for an illustrative water-in-oil emulsion wherein the oil is a crude oil.

The general procedure to prepare a 20/80 water-in-crude oil emulsion involved addition of water or brine to crude oil and mixing. A Silverson mixer supplied by Silverson Machines, Inc. East Longmeadow, Mass. was used. Mixing was conducted at 25° C. and at 400 to 600 rpm for a time required to disperse all the water into the oil. Water was added to the crude oil in aliquots spread over 5 additions. When demulsifier was used, it was added to the emulsion at a treat rate of 0.05 wt % demulsifier formulation based on the weight of emulsion and mixed with a Silverson mixer at 400 to 600 rpm for 10 to 15 minutes. A phenol formaldehyde ethoxylated alcohol demulsifier formulation sold by BASF Corporation as Pluradyne DB7946 was used to demonstrate the invention. When solids were used 0.15 wt % of silica or clay was added to the oil followed by water addition as described above.

Figure 2:
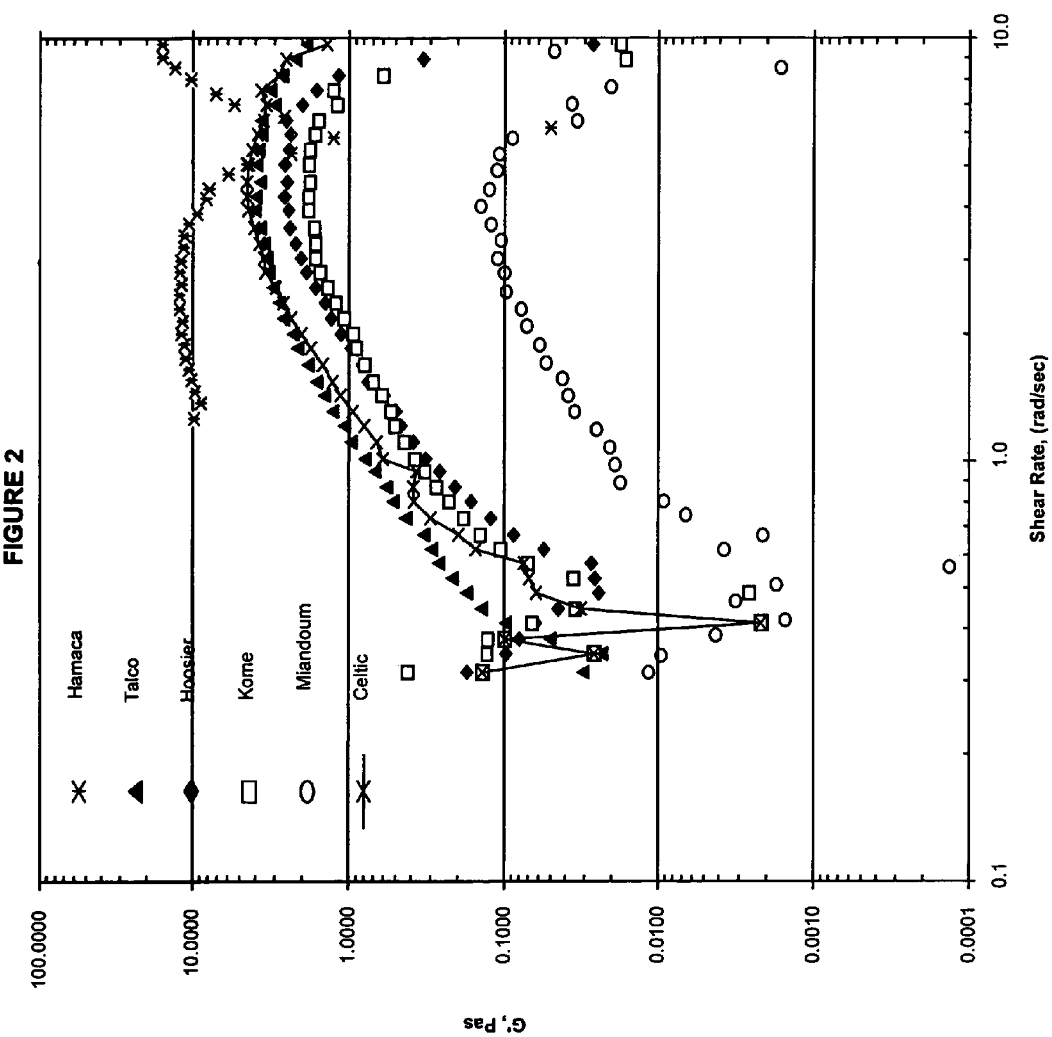
FIG. 2 is an illustrative example of elastic modulus (G') as a function of frequency for a set of water-in-oil emulsions made from crude oils indicated in the legends of FIG. 2.

Prepared emulsions were subject to oscillatory viscometrics and the viscous modulus (G") and elastic modulus (G') as a function of frequency were determined. A Haake CV100 Viscometer was used. FIGS. 1 and 2 are illustrative examples of viscous modulus (G") and elastic modulus (G') as a function of frequency plots for a set of water-in-oil emulsions made from crude oils indicated in the legends in FIGS. 1 and 2.

The invention was demonstrated using two crude oils: West Africa and Hoosier Canada respectively. Oscillatory mixing was conducted using a cone and cup configuration Haake Viscometer CV100. The frequency of oscillation was set at 9 radians per second, (the second fracture frequency) and the amplitude 5 degrees. Samples were oscillatory mixed for 30 minutes at 25° C. After oscillatory mixing, centrifugation was conducted at 25° C. using a Beckman L8–80 Ultracentrifuge at 10,000-rpm (7780 g) for 30 minutes to effect separation of the water and oil phases.

In a typical experiment 30 grams of emulsion was weighed into the cup of the viscometer and mixed as indicted in Table-1. After oscillatory mixing at the fracture frequency for 30 minutes samples were transferred to graduated centrifuge tubes and centrifuged. The amount of water that broke out of the emulsion recorded. Prior to starting the mixing and after mixing, samples were observed under an optical microscope to determine the droplet size of the dispersed water droplets of the emulsion. Control experiments were those that were not subject to any mixing prior to centrifugation.

TABLE 1

| Crude Oil | Water | Solids 1000 ppm | Demulsifier BASF Pluradyne | OSC. Mixing | Demulsification % Brine Breakout | Microscopy Av. Droplet Size |
|---|---|---|---|---|---|---|
| Kome | Kome Brine | Silica | None | None | 0 | <1 micron |
| Kome | Kome Brine | Silica | 0.05 wt % | None | 0 | <1 micron |
| Kome | Kome Brine | Silica | None | 30 minutes | 78 | >30 microns |
| Kome | Kome Brine | Silica | 0.05 wt % | 30 minutes | 97 | >80 microns |
| Kome | Kome Brine | Clay | 0.05 wt % | 30 minutes | 99 | >80 microns |
| Kome | Kome Brine | None | None | 30 minutes | 88 | >50 microns |
| Hoosier | Hoosier Brine | Silica | None | None | 0 | <1 micron |
| Hoosier | Hoosier Brine | Silica | 0.05 wt % | None | 37 | <1 micron |
| Hoosier | Hoosier Brine | Silica | None | 30 minutes | 50 | >30 microns |
| Hoosier | Hoosier Brine | Silica | 0.05 wt % | 30 minutes | 99 | >100 microns |
| Hoosier | Hoosier Brine | Clay | 0.05 wt % | 30 minutes | 99 | >75 microns |
| Hoosier | Hoosier Brine | None | None | 30 minutes | 89 | >75 microns |

Results in Table-1 indicate that oscillatory mixing by itself and in combination with demulsifier significantly enhance demulsification effectiveness.

What is claimed is:

1. A method for demulsifying an emulsion comprising water and oil comprising the steps of:

(a) oscillatory mixing said emulsion to produce an oscillatory mixed emulsion wherein said oscillatory mixing is conducted at about a frequency corresponding to at least one fracture frequency of the emulsion;

(b) separating said oscillatory mixed emulsion into an oil phase and a water phase wherein said fracture frequency is determined by oscillatory viscometry measurements on the emulsion; and (c) recovering said oil and water phases.

2. The method of claim 1 further comprising adding chemical demulsifiers to said emulsion prior to or during said oscillatory mixing step (a).

3. The method of claim 2 wherein said chemical demulsifier is selected from chemical demulsifiers having a molecular weight of about 500 to about 5000 and a hydrophilic lipophilic balance of about 9 to about 35.

4. The method of claim 3 wherein said chemical demulsifier is a phenolformaldehyde ethoxylated alcohol having a formula:

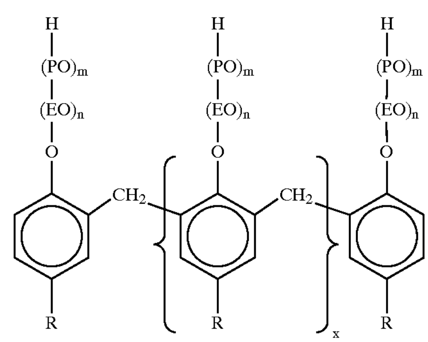

wherein R is selected from the group consisting of alkanes, alkenes, or mixtures thereof from 8 to 20 carbons, E is $CH_2$—$CH_2$ and P is —$CH_2$—CH—$CH_3$, n ranges from 1 to 5, m ranges from 0 to 5 and x ranges from 3 to 9.

5. The method of claim 2 wherein said chemical demulsifier comprises chemical demulsifier and about 35 wt % to about 75 wt % of a delivery solvent selected from the group consisting of crude oil distillates, alcohols, ethers or mixtures thereof.

6. The method of claim 2 wherein the chemical demulsifier is present in an amount from 0.005 to 3.0 wt % based on the weight of emulsion.

7. The method of claim 1 wherein the oil of said emulsion is selected from crude oil, crude oil distillate, crude oil resid, vegetable oil, animal oil, synthetic oil and mixtures thereof.

8. The method of claim 1 wherein the method is conducted at a temperature of about 10 to about 100° C.

9. The method of claim 1 wherein said separation is accomplished by centrifugation, hydrocyclones, microwave, ekctrostatic field, gravity settling and combinations thereof.

10. The method of claim 9 wherein said centrifugation is conducted using a field which ranges from 500 to 150,000g for a time from 0.1 to 6 hours.

11. The method of claim 9 wherein said electrostatic field ranges from about 500 to about 5000 volts per inch for a time from 0.1 to 24 hours.

12. The method of claim 1 wherein said water of said emulsion contains dissolved inorganic salts of chloride, sulfates or carbonates of Group I and II elements of the long form of The Periodic Table of Elements.

13. The method of claim 1 wherein said emulsion contains solids.

14. The method of claim 13 wherein said solids have an average total surface area of $\leqq$1500 square microns.

15. The method of claim 1 wherein said oscillatory mixing is conducted at frequencies in the range of about 0.1 to 75 radians per second.

16. The method of claim 1 wherein said oscillatory mixing is conducted in continuous or pulse mode.

17. The method of claim 1 wherein said emulsion is a water-in-oil emulsion.

18. The method of claim 1 wherein said emulsion is an oil-in-water emulsion.

19. The method of claim 1 wherein said emulsion is a mixture of oil-in-water emulsion and water-in-oil emulsion.

20. A method for separation of a water-in-oil emulsion in a process scheme including an on-line oscillatory mixer comprising the steps of:

(a) collecting a water-in-oil emulsion from said process scheme;

(b) determining elastic modulus of the emulsion as a function of frequency in the frequency range of 0.1 to 75 radians per second;

(c) determining fracture frequencies of said emulsion from the said determination of the elastic modulus of the emulsion as a function of frequency;

(d) setting the said on-line oscillatory mixer to oscillate at a frequency corresponding to at least one determined fracture frequencies;

(e) oscillatory mixing said water-in-oil emulsion in said on-line oscillatory mixer set to said determined fracture frequency; and (f) separating said mixed emulsion into a layer comprising water and a layer comprising oil.

* * * * *